Dec. 10, 1968   G. L. GAINES, JR., ET AL   3,415,682
TRANSPORT STRUCTURE FOR DEFORMABLE MEDIUM IN A LIQUID
LIGHT VALVE PROJECTION APPARATUS
Filed May 17, 1965
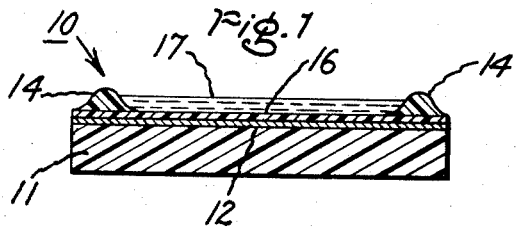
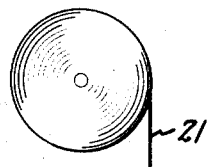
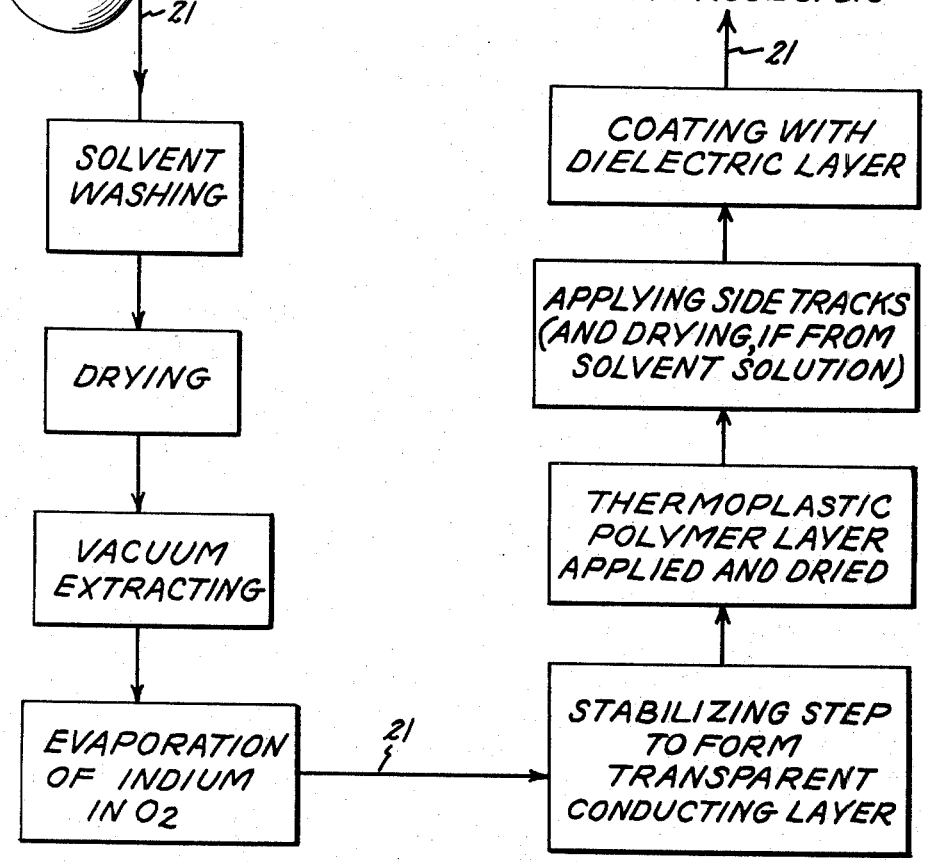
Inventors:
George L. Gaines Jr.,
Carlyle S. Herrick,
Robert P. Anderson,
by
Their Attorney.

United States Patent Office

3,415,682
Patented Dec. 10, 1968

3,415,682
TRANSPORT STRUCTURE FOR DEFORMABLE MEDIUM IN A LIQUID LIGHT VALVE PROJECTION APPARATUS
George L. Gaines, Jr., Scotia, and Carlyle S. Herrick, Alplaus, N.Y., and Robert P. Anderson, Dalton, Mass., assignors to General Electric Company, a corporation of New York
Filed May 17, 1965, Ser. No. 456,088
4 Claims. (Cl. 117—218)

ABSTRACT OF THE DISCLOSURE

An improved structure for transporting a transparent deformable liquid medium past the scanning electron beam in a liquid light valve projection apparatus and a process for its preparation is described. A layer of thermoplastic polymeric solid having a surface energy greater than about 24 dynes/cm. is interposed between a transparent electrically conducting coating and a coating of the deformable liquid medium, the combination of electrically conducting coating, polymeric solid layer and liquid deformable medium being supported and carried on a transparent substrate. A tape construction and a method of preparing such a tape is described as exemplary of the transport structure of this invention.

This invention relates to a structure for transporting a deformable medium on its surface, which medium is bombarded by an electron beam to form refraction or diffraction gratings therein. More particularly, the invention relates to improved construction of the transport structure to increase its accuracy of image production.

In a known light valve projection apparatus, an electron beam is scanned across the surface of a deformable medium and modulated to form refraction or diffraction gratings in the surface of the medium. A Schlieren optical system and a light source are provided for readout and light rays from the source are projected upon the surface of the deformable medium and thence onto a viewing screen where an image representative of the modulating intelligence is reproduced.

After repeated bombardment by the electron beam, presently known deformable mediums tend to exhibit irradiation damage which is characterized by irregularities such as gelations and by other chemical modifications in the body of the medium. These irregularities interfere with the faithful reproduction of an image. By continuously removing and replenishing the medium in the area of electron impingement with fresh deformable medium, this adverse effect can be reduced.

One arrangement for replenishing the medium is by the use of a strip of transparent tape having a transparent deformable medium coated on a surface thereof. The tape is mounted within an evacuated envelope of an electron discharge device and is adapted to be transported across an inner surface of an output window of the device. As the tape is drawn past the output window, a scanning electron beam impinges thereon and forms refraction or diffraction gratings in the surface of the medium at a position on the tape opposite the output window surface. The medium is thus continuously replenished in the area of beam impingement by the use of this transport mechanism.

A liquid light valve projection apparatus of the type intended for use of the novel tape construction in accordance with this invention is disclosed in the copending application of Campbell et al., Ser. No. 318,932, filed Oct. 25, 1963 (now U.S. Patent No. 3,260,798), and assigned to the assignee of the instant application. Also a suitable projection system and appropriate deformable mediums are broadly disclosed in U.S. 2,943,147—Glenn.

The amplitudes of the impressed gratings are dependent in large measure upon the viscosity of the medium as well as upon the image intelligence contained in the modulated beam. When presented in the area of beam impingement, the medium desirably has the consistency of a liquid. However, storage of the tape prior to use is facilitated, if the medium possesses a relatively higher viscosity at room temperature. Both these contrary requirements can be satisfied by providing means for controlling the viscosity of the medium at the area of electron beam impingement.

Accordingly by the use of such a liquid light valve projection apparatus and the aforementioned tape the reproduction of standard television signals is accomplished by electron beam writing on the deformable dielectric medium when the medium has been rendered quite fluid by the application of heat thereto whereby suitably fast relaxation time constants for the medium are obtained. This period of fluidity, however, increases the susceptibility of the tape construction to the action of surface agents, which are frequently carried to the tape on minute foreign particles and also arrive as gaseous molecules, which are inevitably present even within the projection apparatus. An example of a source of gaseous molecules is vaporized diffusion pump oil, which is contributed by the evacuating apparatus.

After the arrival of such a foreign particle on the dielectric surface, the surface agent material so transported to the dielectric surface penetrates through the deformable dielectric layer toward the tape substrate until it encounters the conducting layer interposed between the tape substrate and the dielectric layer in typical tape construction. Here the surface agent material spreads out over the conducting layer approximately a monolayer thick causing the liquid dielectric medium to retreat from the area of the conducting layer newly covered by the surface agent material. This retreat of the dielectric medium destroys contact between the liquid dielectric medium and the conducting layer in such areas, which areas are then described as being "unwet." The disadvantages of this phenomenon are that such unwet areas, where they may occur on the tape, create undesirable optical blemishes in and fail to reproduce minute portions of the projected picture when the tape is exposed to the dark field optical system readout employed in such light valve projection apparatus.

Thus, in greater detail, because the transparent conducting layer, which overlies the transparent tape substrate, comprises a dense surface organized in a definite crystalline pattern, reactive organic molecules will chemisorb in a monolayer over such a surface, rather than to penetrate into such a surface and effectively disappear. The physical explanation for this phenomenon is the fact that clean oxide and clean metal surfaces (such as is the case with the conducting layer) are high energy surfaces (i.e. from about 200 to about 500 dynes/cm.). When low surface energy materials come into contact with such high energy surfaces (i.e. unintentional contamination from the atmosphere around the tape in manufacture, storage or use) the low surface energy agent disperses itself as a monolayer covering as much of the high energy surface as it is able to cover at this thickness. Wherever the monolayer is able to position itself the energy of the covered surface is reduced to that of the low surface energy agent.

As an example, in the case of contaminants having —$CH_3$ end groups, the surface energy has a magnitude of from about 22 to about 24 dynes/cm. This diminishing of high surface energy over the areas of conducting layer material so effected is to be avoided, because as has been indicated above, a surface with its energy so decreased will result in the occurrence of unwetting between these affected areas and the subsequently deposited dielectric layer. This unwetting may not be immediately apparent, because when a dielectric material having a surface energy, for example, of about 30 dynes/cm. or greater is brought into contact with a surface having a surface energy of about 22 dynes/cm., intimate contact may be prompted between the coating material and the underlying surface. The problem, however, lies in maintaining the small contact angle between the dielectric material and the conductive layer receiving it, which is initially obtained, because of the energy put into the system during the application of the dielectric coating, but thereafter as the system stabilizes itself the liquid dielectric coating material has a tendency to collect itself into droplets thereby receding from certain areas of the surface. These areas are then said to be unwet.

The preferred construction of the tape, or other liquid dielectric transport structure, as for example, a disc, would be one, which would completely obviate the creation of unwet areas. Optical blemishes destructive to the display pattern desired will result from such unwet areas, because of light scattering from the boundaries of the unwet areas and, in addition, the extent of the unwet area in each instance is lost as to the picture elements that should occur there.

It is therefore a prime object of this invention to minimize the incidence of areas of unwetting of the surface coated with the deformable medium and thereby to increase the fidelity of picture reproduction from the imposed signals.

It is another object of this invention to provide means for diminishing the risk of unwetting between the deformable medium and the surface to which it is applied whereby completed tape may be safely stored.

It is a further object of this invention to promptly provide protection over the newly stabilized transparent conducting layer in the manufacture of a recording medium upon which intelligence is impressed by bombardment with an electron beam.

The attainment of the above and other objects of this invention is made possible by the provision of a thin layer of solid thermoplastic polymer between the conducting layer and the liquid dielectric medium. This thin layer of solid polymer need not be a conductor of electricity and, surprisingly, its presence does not interfere with the process of deformation of the liquid dielectric by means of the electron beam as required for the imposition of intelligence to the surface thereto.

In operation, in the absence of the thermoplastic polymer layer, series electrical conduction occurs from the point of impingement of the electron beam, through the dielectric medium and to the electrically conductive layer. This electrical conduction occurs with difficulty because of the substantial resistivity of the dielectric medium (about $10^{11}$ ohm-cm.) and it would be expected that the superimposition of the thermoplastic layer, which would even have a resistivity three to four orders of magnitude greater (e.g. nylon has a resistivity of about $10^{15}$ ohm-cm.) than the dielectric layer, would interfere with the electrical conduction through the requisite series path.

The exact nature of this invention as well as other objects and advantages thereof will be readily apparent from consideration of the following specification relating to the annexed drawing in which:

FIG. 1 schematically represents in cross-section a transparent tape construction contemplated in accordance with this invention as initially manufactured, and FIG. 2 is a flow diagram schematically illustrating the method of preparing a recording medium in accordance with this invention.

The tape construction shown in FIG. 1 is exemplary of a transport structure prepared in accordance with this invention. Although a transparent tape has been selected, by way of example, the problem solved by the instant invention may occur with reflective type tape in which this invention is equally applicable.

Tape 10 comprises a transparent plastic substrate 11, such as polyethylene terephthalate (known commercially as "Cronar" manufactured by E. I. du Pont de Nemours and Company of Wilmington, Del.). The manufacture of such polyethylene terephthalate is described in U.S. Patent 2,641,592—Hofrichter. A transparent conductive film 12 is deposited on the surface of substrate 11. This film 12 may be a thin layer of metal or an electrically conductive metal oxide, as for example, indium oxide. Edges 14 applied to the coated substrate are located out of the area of electron beam impingement and therefore may be made of any suitable, economical material and may comprise strips of plastic cellulose acetate. However, in practice, polyvinyl acetate from a solvent solution is applied in tracks; one along either edge of the tape. Evaporation of the solvent leaves the ridges 14 shown in exaggerated vertical scale. A thin layer of solid thermoplastic polymer 16 may be applied over film 12 prior to applying edges 14 or as an alternate construction the edges 14 may be applied first and then layer 16 may be applied between edges 14. The former construction is more convenient and is shown in FIG. 1.

This thin thermoplastic polymer layer 16 should be amorphous, at least in part, in that if any crystallinity occurs in this layer 16 it should be a random disposition of microcrystals rather than a continuous crystal-to-crystal relationship of macrocrystals over the surface of the tape. Although it is preferable to employ a thickness of about ½ micron for the polymer layer, a thinner or thicker layer than ½ micron may satisfactorily be employed. The surface energy of the thermoplastic polymer employed must be greater than about 24 dynes/cm.

It is preferable that the later-applied dielectric layer 17 be partly soluble in the thermoplastic polymer layer 16 with the result that a gradual "swelling" of the polymer layer 16 occurs. This occurrence referred to as "swelling" results from the penetration of dielectric molecules into the polymer coating 16. This coating increases in volume as it changes in composition to reach a final state of equilibrium. Although it is not known for certain, it is conjectured that this intermingling of dielectric medium molecules into the solid polymer is responsible for the unexpected electrical behavior of the polymer layer. The approach to, and maintenance of, this state of equilibrium is accomplished without causing the swollen polymer layer to detach itself from conducting layer 12 and thereby continual protection against invading contaminants is maintained.

Examples of a number of thermoplastic polymeric solids suitable for the practice of this invention are set forth in the following table:

TABLE I

| Polymeric solid: | Dynes/cm. at 20° C. |
|---|---|
| Polyvinylidene fluoride | 25 |
| Polyvinyl fluoride | 28 |
| Polyethylene | 31 |
| Polytrifluorochloroethylene | 31 |
| Polystyrene | 33 |
| Polyvinyl alcohol | 37 |
| Polymethyl methacrylate | 39 |
| Polyvinyl chloride | 39 |
| Polyvinylidene chloride | 40 |
| Polyethylene terephthalate | 43 |
| Polyhexamethylene adipamide | 46 |

The list of polymeric solids set forth in Table I is not intended to be exhaustive, but simply exemplary, as the basic criterion of the thermoplastic polymer selected must be that its surface energy be greater than about 24 dynes/cm.

The method of manufacture of the transport structure of this invention is schematically represented in FIG. 2.

Many of the essential steps in the preparation of such tape are set forth in the copending U.S. patent application Ser. No. 161,003—Herrick, filed Dec. 21, 1961 (now U.S. Patent No. 3,201,275) and assigned to the assignee of this invention, wherein thermoplastic recording tape is prepared employing many steps in common with the steps required for this invention.

The transparent plastic substrate, after removal from the surface thereof of any dust, dirt or other such matter, is passed into a solvent washing apparatus to remove from the substrate such undesirable materials as may be present, for example, polyvinyl alcohol, gelatin, the cyclic dimer and trimer of ethylene terephthalate, etc., by the use of a solvent solution of water, alcohol and a commercial detergent. The commercial detergent should be of the type used for cleaning glass components prior to fabricating glassware equipment. Such detergent must be able to clean the surface of the glass so as not to leave any residue film to interfere with glass to glass bond. After the solvent washing process, tape 21 moves through a drying apparatus wherein heated air, $CO_2$ or nitrogen is employed to dry the tape prior to introduction thereof into the vacuum extracting apparatus for the devolatizing step, which comprises subjecting the tape 21 to low pressure conditions, i.e. about $1 \times 10^{-3}$ mm. of mercury. Under these low pressure conditions water vapor and residual extractant are removed from the surface of the tape.

The tape so cleaned passes into a vacuum chamber for the deposition thereon of a transparent conducting layer. This is accomplished preferably by the method described in copending U.S. patent application Ser. No. 386,494—Kiser et al., filed July 31, 1964 (now U.S. Patent No. 3,356,529) and assigned to the assignee of this invention. This method consists of two steps wherein indium metal is first deposited on the substrate at reduced pressure in the presence of oxygen. Later a transparent conductive film is formed by the conversion of the indium metal to indium oxide, which is ordinarily accomplished by heating the indium layer in air. This latter step is often referred to as a stabilizing operation.

The cleaned plastic substrate coated with the transparent indium oxide conductive layer is then coated with a solution of appropriate thermoplastic polymeric solid, i.e. nylon in isopropanol. Preferably, the thickness of this solid thermoplastic polymeric layer will be about one-half micron in thickness, although thinner or thicker layers may satisfactorily be employed. The layer of polymeric solid quickly dries and the ridges are then applied along the sides of the tape as already described. If the ridges are applied from solvent solution the tape must then be dried. Thereafter the dielectric medium is applied over the solid polymer layer between the ridges 14 and remains in the liquid state although the viscosity of the dielectric medium may be high. One preferable manner of application of each of the sequentially applied materials; namely, the thermoplastic polymer solid layer 16, ridges 14 and dielectric medium 17 is by the use of a meniscus-type coating apparatus disclosed in U.S. patent application Ser. No. 161,003—Herrick, mentioned hereinabove.

The completed tape may then either be rolled up or introduced into an electron-beam projector for use therein as an operative recording medium. The dielectric layer remains in the liquid state as earlier described.

A prime advantage of the instant invention wherein a layer of thermoplastic polymeric solid is applied directly over the clean stabilized metal or metal oxide layer is the fact that with this barrier present the possibility of contamination of the conducting layer is greatly diminished. The manufacturing process is thereby rendered more effective. In those instances in which the completed tape is to be stored for usage, later contamination of the conducting layer is precluded, thereby greatly increasing shelf life of the tape.

Thus, by the practice of the instant invention the deleterious effects of surface contaminants, which in past liquid dielectric transport constructions have become manifest as optical blemishes and loss of portions of the picture area as the result of the detachment of the dielectric layer from the conducting layer, are greatly decreased.

What we claim as new and desire to secure by Letters Patent of the United States is:

1. A structure for transporting a transparent deformable liquid medium past the scanning electron beam in a liquid light valve projection apparatus comprising in combination.
   (a) a transparent substrate,
   (b) a transparent electrically conducting coating,
   (c) a layer of thermoplastic polymeric solid having a surface energy greater than about 24 dynes/cm. and
   (d) a coating of dielectric material, which remains in the liquid state,
      (1) said layer of polymeric solid being interposed between and in contact with both said coating of dielectric material and said transparent conducting coating, said transparent conducting coating in turn being in contact with and covering one major surface of said transparent substrate.

2. The transport structure substantially as recited in claim 1 wherein the thickness of the polymeric solid layer is about ½ micron and the polymeric solid is polyhexamethylene adipamide.

3. In the process for preparing a structure for transporting a transparent deformable liquid medium past the scanning electron beam in a liquid light valve projection apparatus in which process a transparent substrate is coated with an electrical conducting layer and the substrate so coated has applied thereto a coating of liquid dielectric, the improvement comprising: depositing a thin layer of a thermoplastic polymer over the clean electrical conducting layer, said polymer layer drying into the solid state and depositing the coating of liquid dielectric over the solid polymer layer.

4. The improvement recited in claim 3 wherein the thermoplastic polymer is polyhexamethylene adipamide.

References Cited

UNITED STATES PATENTS

| | | | |
|---|---|---|---|
| 3,260,798 | 7/1966 | Campbell et al. | 178—7.87 |
| 3,341,855 | 9/1967 | Herrick | 242—55.11 X |
| 3,201,275 | 8/1965 | Herrick | 117—213 |
| 3,262,122 | 7/1966 | Fleisher et al. | 96—1.1 |
| 3,317,315 | 5/1967 | Nicoll et al. | 117—218 |

ALFRED L. LEAVITT, *Primary Examiner.*

C. K. WEIFFENBACH, *Assistant Examiner.*

U.S. Cl. X.R.

117—217, 211